United States Patent [19]
Paletta, deceased et al.

[11] Patent Number: 4,767,221
[45] Date of Patent: Aug. 30, 1988

[54] COMPLIANT HYDRODYNAMIC GAS LUBRICATED THRUST BEARING

[75] Inventors: Guisuppe Paletta, deceased, late of Birmingham; Angelo D. Paletta, legal representative, Orchard Lake, both of Mich.

[73] Assignee: Williams International Corporation, Walled Lake, Mich.

[21] Appl. No.: 60,495

[22] Filed: Jun. 11, 1987

[51] Int. Cl.$^4$ ............................................. F16C 23/04
[52] U.S. Cl. ................................... 384/105; 384/106
[58] Field of Search ............... 384/105, 106, 104, 103, 384/224

[56] References Cited
U.S. PATENT DOCUMENTS

| | | | |
|---|---|---|---|
| 4,462,700 | 7/1984 | Agrawal | 384/105 |
| 4,552,466 | 11/1985 | Warren | 384/106 |
| 4,621,930 | 11/1986 | Gu et al. | 384/105 |
| 4,668,106 | 5/1987 | Gu | 384/106 |

*Primary Examiner*—Lenard A. Footland
*Attorney, Agent, or Firm*—Lyman R. Lyon

[57] ABSTRACT

A self-pressurizing compliant gas thrust bearing includes a resilient support system having a multi-stage spring arrangement for supporting a flexible foil. The compliant and resilient support system enables the bearing to accomodate extreme transient loads, local thermal distortions, shaft misalignment and runout.

1 Claim, 1 Drawing Sheet

COMPLIANT HYDRODYNAMIC GAS LUBRICATED THRUST BEARING

BACKGROUND OF THE INVENTION

Compliant hydrodynamic gas lubricated thrust bearings are ideally suited to conditions found in high performance machinery subject to extreme conditions of temperature and speed. However, there is room for improvement in overall load capacity and dynamic stability of the rotor-bearing system at all speeds.

The principal difficulties experienced in known compliant foil thrust bearing systems has been that known bearings exhibit limited foil stiffness resulting in an inability to control axial displacement between the movable and stationary members at elevated speeds. While it is advantageous to minimize the thickness of the foil bearing in order to render the foil sufficiently compliant to conform to the supported member under all conditions, such thin foils exhibit a reduced load-bearing capacity.

Moreover, known gas lubricated thrust bearings do not present a complete solution to the problems of hydrodynamic bearings since there is still a requirement for (a) greater load-carrying capacity (b) a bearing which compensates for misalignment between the movable and stationary elements, and (c) accomodation of thermal distortion of the movable element due to rapid heating of the surface of the movable element nearest the stationary element while the remainder of the movable element remains relatively cool.

SUMMARY OF THE INVENTION

The present invention relates generally to self-pressurizing compliant hydrodynamic gas thrust bearings that axially space and position two relatively rotatable members by a thin fluid film. More particularly, the invention relates to foil-type gas bearings in a plurality of resilient pads which are provided for supporting and stiffening the foil to enhance the load-carrying capability of the bearing and to provide axial dampening and cushioning between the two relatively movable members.

DETAILED DESCRIPTION OF THE PREFERRED EMBODIMENT OF THE INVENTION

Figure 1:
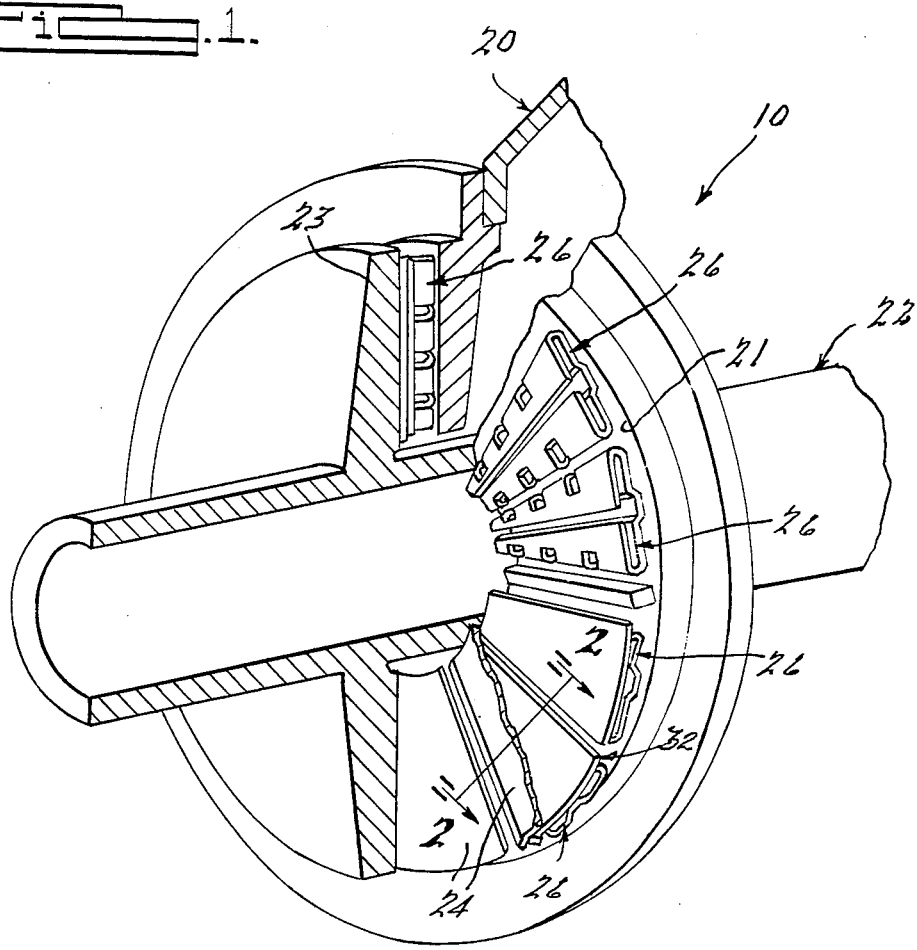
FIG. 1 is a perspective view, partially broken away, of a gas thrust bearing made in accordance with the instant invention.
Figure 2:
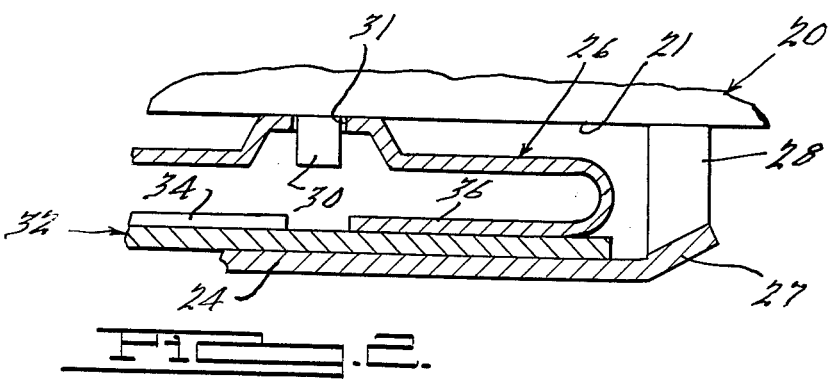
FIG. 2 is an enlarged sectional view taken along the line 2—2 of FIG. 1.

Referring to FIG. 1 of the drawings, a compliant hydrodynamic gas thrust bearing assembly 10 in accordance with a preferred and constructed embodiment of the present invention comprises a fixed thrust bearing support and shaft journal 20 having an end face 21. The shaft journal 20 is disposed about a shaft 22. The shaft 22 has a radially extending thrust plate 23 that rotates in controlled spaced relation to the end face 21 on the shaft journal 20.

In accordance with the present invention, a flexible compliant foil 24, is supported in axially juxtaposed relation to the thrust plate 23 by multiple resilient spring elements 26. An end portion 27 of the foil 24 is fastened, as by welding, to a spacer block 28 which is attached, as by welding, to the radial face 21 shaft of the journal 20.

The spring elements 26 are positioned on the end face 21 of the shaft journal 20 by a like plurality of circumferentially spaced locator tabs 30 which are accepted in complementary slots 31 in the spring elements 26.

Each spring element 26 supports a pad 32 which is attached, as by welding, to either or both free ends 34 and 36 of the spring support 26. Each pad 32 on each spring element 26 contacts and radially positions the foil 24. It is to be noted that no attachment is provided between the pads 32 and the opposed surface of the foil 24. Thus, each pad 32 on each spring element 26 serves two functions, namely, (a) to provide localized stiffness to the foil 24 to prevent unwanted undulations in the hydrodynamic fluid film supporting surface thereof that would decrease the load carrying capacity of the bearing and (b) to provide the primary Coulomb damping action in the bearing under oscillatory loads. This damping occurs between the active surfaces of each pad 32 and the opposed surface of the foil 24. Since damping is directly related to the coefficient of friction between the foil 24 and pad 32, surface treatment of one or both members can be utilized to fine tune the damping characteristics.

Rotation of the shaft 22 relative to the foil 24 induces the formation of a boundary layer of gas in a converging wedge-shaped gap between the surface of the thrust plate 23 and the bearing surface of the foil 24.

The spring elements 26 and their attached pads 32 provide for both radial and longitudinal deflection of the foil 24 in accordance with the pressure profile of the hydrodynamic gas film so as to provide maximum load carrying capacity, to tolerate bearing misalignments and skew loads, and to tolerate axial thermal distortions. Load carrying capacity is further enhanced by the geometry of the spring elements 26 which provide an initial soft layer of support that becomes progressively stiffer in the axial direction.

Under misaligned or skewed load conditions, substantial deflection of one edge of the bearing assembly 10 may occur in a direction normal to the axis of the shaft 22. Such lateral deflections in the form of relative misalignment between the shaft 22 and the stationaly bearing 20 are compensated by the spring elements 26. The spring constant of the spring elements 26 and the pads 32 provide the means to tailor resistance to cocking or lateral deflection of the bearing 10 thereby to tolerate bearing misalignment and skew loads.

In operation, the clearance space between the thrust plate 23 on the shaft 22 and the foil 24 remains substantially uniform within the constraints imposed by the pressure profile of the hydrodynamic gas fluid-film. It also enables the pressure profile across the foil 24 to be relatively uniform since the bearing clearance is relatively uniform, thereby minimizing any reduction in load capacity of the bearing. In addition, heat generated in the fluid film and transferred to the foil 24 is relatively uniform from edge to edge as opposed to the situation where the clearance is greater at one edge than the other. Uniformity of heat generation in the foil 24 prevents localized heat distortion thereof which otherwise could cause the foil smallest clearance and contact the thrust plate 23 of the shaft 22 with consequent damage to the bearing 10.

From the foregoing, it should be apparent that the spring elements 26 along with the pad elements 32 comprise a compliant foil support system which optimizes performance of the bearing 10. The support system optimizes (a) the load carrying capacity of the hydrodynamic fluid film; (b) bearing damping capability; (c) the optional provision for staged increase in stiffness with increasing load on the foil; (d) the capability to control distortions along the foil in the axial direction, and (e) the capability of the bearing to withstand misalignment between the foil and the shaft.

While the preferred embodiment of the invention has been disclosed, it should be appreciated that the invention is susceptible of modification without departing from the scope of the following claim.

I claim:

1. A self-pressurizing compliant hydrodynamic gas thrust bearing assembly comprising:

a shaft having a radially extending thrust plate thereon, a shaft journal supporting said shaft having a radially extending face thereon, juxtaposed to the thrust plate on said shaft, a plurality of U-shaped spring elements each of which has a bight portion and reentrantly secured to folded leg portions, the bight portion of each of said spring elements being secured to and extending radially of the end face of said shaft journal, a plurality of pads secured to the leg portion of said spring elements, respectively, and a flexible foil interposed between the pads on the end face of said journal and the thrust plate on said shaft, one end of said foil being secured to the end face of said shaft journal to preclude indexing of said foil.

* * * * *